United States Patent
Monden et al.

(10) Patent No.: US 12,021,387 B2
(45) Date of Patent: Jun. 25, 2024

(54) POWER STORAGE CONTROL SYSTEM

(71) Applicants: KABUSHIKI KAISHA TOSHIBA, Tokyo (JP); TOSHIBA ENERGY SYSTEMS & SOLUTIONS CORPORATION, Kawasaki Kanagawa (JP)

(72) Inventors: Yukitaka Monden, Kawasaki Kanagawa (JP); Shuji Yamazaki, Yokohama Kanagawa (JP); Takenori Kobayashi, Tokyo (JP)

(73) Assignees: Kabushiki Kaisha Toshiba, Tokyo (JP); Toshiba Energy Systems & Solutions Corporation, Kawasaki (JP)

(*) Notice: Subject to any disclaimer, the term of this patent is extended or adjusted under 35 U.S.C. 154(b) by 14 days.

(21) Appl. No.: 18/002,153

(22) PCT Filed: Sep. 9, 2020

(86) PCT No.: PCT/JP2020/034140
§ 371 (c)(1),
(2) Date: Dec. 16, 2022

(87) PCT Pub. No.: WO2021/260958
PCT Pub. Date: Dec. 30, 2021

(65) Prior Publication Data
US 2023/0223757 A1     Jul. 13, 2023

(30) Foreign Application Priority Data
Jun. 22, 2020   (JP) .................. 2020-107185

(51) Int. Cl.
*H02J 3/32*      (2006.01)
*H02J 7/00*      (2006.01)
(Continued)

(52) U.S. Cl.
CPC .............. *H02J 3/32* (2013.01); *H02J 7/0048* (2020.01); *H02J 7/0063* (2013.01);
(Continued)

(58) Field of Classification Search
CPC .... H02J 3/32; H02J 7/00; H02J 7/0048; H02J 7/00712; H02J 7/0063; H02J 7/14; H02J 7/34
See application file for complete search history.

(56) References Cited

FOREIGN PATENT DOCUMENTS

JP        6456651 B2      1/2019

*Primary Examiner* — Robert L Deberadinis
(74) *Attorney, Agent, or Firm* — Finnegan, Henderson, Farabow, Garrett & Dunner, LLP

(57) ABSTRACT

A power storage control system includes a storage battery and a controller. The storage battery supplies electric power to an electric power system in collaboration with a power generator in response to a command value. The controller outputs, to the power generator, a stop signal causing the power generator to stop power generation when a state of charge of the storage battery is larger than a given value. The controller outputs, to the power generator, an execution signal causing the power generator to execute power generation when the state of charge is not larger than the given value. The controller acquires an actual electric power value generated by the power generator. The controller outputs a control signal causing the storage battery to execute charging and discharging for satisfying the command value on the basis of a difference between the command value and the actual electric power value.

7 Claims, 4 Drawing Sheets

(51) Int. Cl.
*H02J 7/14* (2006.01)
*H02J 7/34* (2006.01)
(52) U.S. Cl.
CPC ............ *H02J 7/00712* (2020.01); *H02J 7/14* (2013.01); *H02J 7/34* (2013.01)

POWER STORAGE CONTROL SYSTEM

CROSS-REFERENCE TO RELATED APPLICATIONS

This application is a national stage application of International Application No. PCT/JP2020/034140, filed Sep. 9, 2020, which designates the United States, incorporated herein by reference, and which claims the benefit of priority from Japanese Patent Application No. 2020-107185, filed Jun. 22, 2020, the entire contents of which are incorporated herein by reference.

FIELD

Embodiments described herein relate generally to a power storage control system.

BACKGROUND

Conventionally, supply and demand control has been performed in order to maintain equalization of the electric power supply and demand of electric power systems. For example, frequency is controlled so as to be within a permissible deviation with respect to a rated frequency, and thereby fluctuation in frequency is reduced. Frequency adjustment for electric power systems is performed by, for example, combining economical load distribution control and load frequency control. The economical load distribution control is performed by adjusting a load that fluctuates over a cycle of a few tens of minutes or more (a long cycle). The load frequency control is performed by adjusting a load that fluctuates over a cycle of not more than the long cycle (a short cycle). In the load frequency control, the frequency is controlled to be maintained at the rated frequency by output control of a power generator, such as a gas turbine, a steam turbine, or hydroelectric power generation, or by charging and discharging control of a storage battery (a secondary battery) to reduce short-cycle frequency fluctuations.

As the reduction in the short-cycle frequency fluctuations using the power generator and the storage battery, for example, a contribution rate as the rate of the output of the storage battery is determined for a target output, which is calculated from a system frequency, in accordance with the state of charge (SOC) of the storage battery.

A control method has been proposed, in which a difference between the frequency of an electric power system and a reference frequency is reduced by controlling the charging and discharging amount of a storage battery system including the storage battery on the basis of the contribution rate and controlling the output of the power generator on the basis of the contribution rate.

In the conventional technologies, the ratio between the charging and discharging electric power of the storage battery and the output of the power generator is determined from the state of charge (SOC) of the storage battery. Therefore, in a case where a target output is slow in change per time (for example, the output change is about 90 seconds), such as a case that a response delay of the power generator can be reflected in the contribution rate, the charging and discharging electric power of the storage battery and the output of the power generator can be made to follow the target output. However, in a case where a target output is fast in change per time (for example, the output change is less than 10 seconds), such as a case that a response delay of the power generator cannot be reflected in the contribution rate, the output of the power generator cannot be made to follow the target output, and there is a problem in that the target output and the actual output may be different from each other. Therefore, if a power storage control system that, even when target output with a fast output change per unit time is required, can reduce the difference between the target output and the actual output can be provided, a high-quality electric power supply service satisfying user requirements can be achieved, which is meaningful.

DETAILED DESCRIPTION

A power storage control system according to an embodiment includes a storage battery, command acquisition circuitry, power generation controller circuitry, power generation controller circuitry, actual electric power acquisition circuitry, and power storage controller circuitry. The storage battery is capable of supplying electric power to an electric power system in collaboration with a power generator in response to a charging and discharging command value. The command acquisition circuitry is configured to acquire the charging and discharging command value. The power generation controller circuitry is configured to output, to the power generator, a power generation stop signal causing the power generator to stop power generation. The power generation stop signal is output in a case where a state of charge of the storage battery is larger than a given value. The power generation controller circuitry is configured to output, to the power generator, a power generation execution signal causing the power generator to execute power generation. The power generation execution signal is output in a case where the state of charge is equal to or less than the given value. The actual electric power acquisition circuitry is configured to acquire an actual electric power value generated by the power generator. The power storage controller circuitry is configured to output a storage battery control signal causing the storage battery to execute charging and discharging for satisfying the charging and discharging command value on the basis of a difference between the charging and discharging command value and the actual electric power value.

The following describes embodiments of the present invention with reference to the drawings. The configurations of the embodiments described below and actions and results (effects) brought about by the configurations are only by way of example and are not limited to the following described details.

Figure 1:
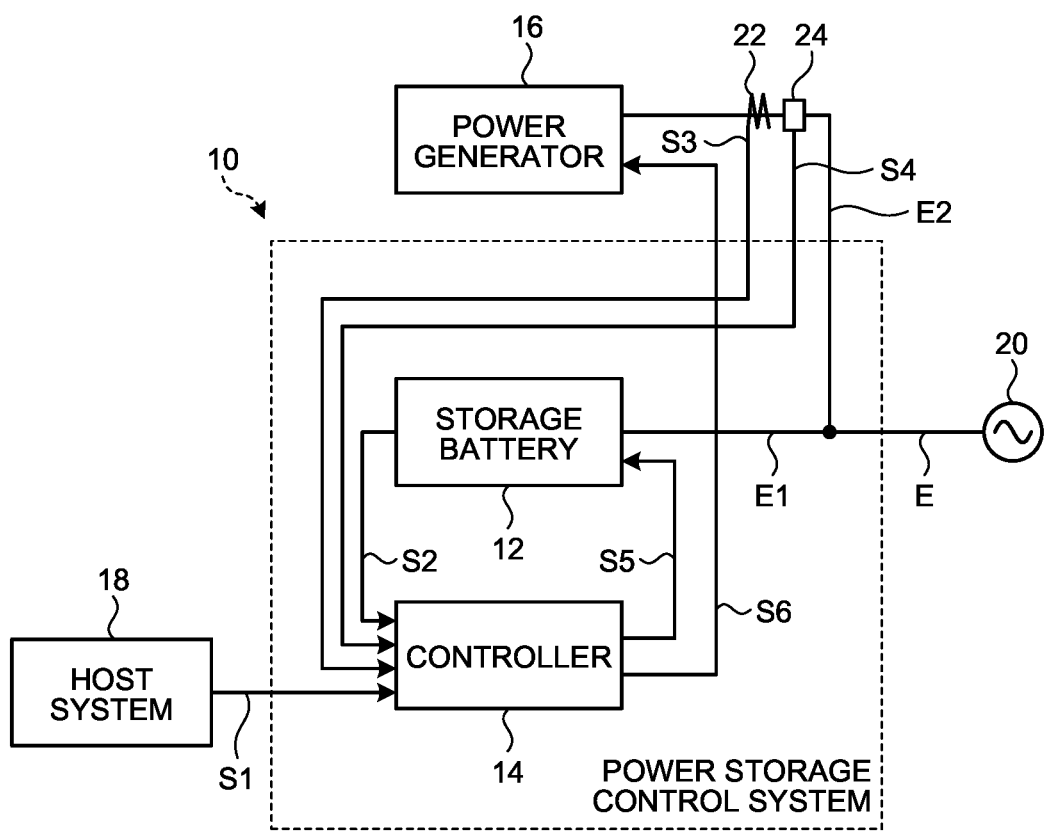
FIG. 1 is an exemplary and schematic block diagram illustrating a configuration of a power storage control system according to embodiments.

FIG. 1 is an exemplary and schematic block diagram illustrating a configuration of a power storage control system 10 according to embodiments described below.

The power storage control system 10 includes a storage battery 12 and a controller 14. A power generator 16 is connected in parallel to the storage battery 12 of the power storage control system 10. Desired electric power is output to a commercial power supply 20 (an electric power system) in accordance with a charging and discharging command value S1 input from a host system 18. The power generator 16 is, for example, thermal power generation equipment using a gas turbine or steam turbine, hydroelectric power generation equipment, or the like. The host system 18 is a control apparatus operable and manageable by an electric power supplier and is a management system that can supply the charging and discharging command value S1 and so forth to the power storage control system 10 in accordance with an electric power supply and demand plan or the like.

In the power storage control system 10 of the present embodiment, the power generator 16 is provided along with the storage battery 12. The storage battery 12 executes charging and discharging in accordance with the charging and discharging command value during normal times. But, in a case where a remaining energy amount as the state of charge (SOC) of the storage battery 12 decreases, the power generator 16 is started up to restore the remaining energy amount of the storage battery 12, thus enabling electric power adjustment following the charging and discharging command value S1 while the capacity of the storage battery 12 remains decreasing.

As illustrated in FIG. 1, an output line E1 of the storage battery 12 and an output line E2 of the power generator 16 are connected to an electric power line E of the commercial power supply 20 in parallel. When, for example, the storage battery 12 discharges A (kW) and the power generator 16 generates B (kW), an electric power of A+B (kW) is output to the commercial power supply 20 via the electric power line E. When, for example, the storage battery 12 charges with A (kW) and the power generator 16 generates A (kW), an electric power of (A−A)=0 (kW) is output to the commercial power supply 20. In other words, when viewed from the commercial power supply 20, it appears as if the power storage control system 10 was out of operation.

In the thus configured power storage control system 10, the storage battery 12 constantly transmits SOC information S2 indicating the remaining energy amount (the state of charge) of the battery to the controller 14. In many cases, the SOC generally indicates a fully discharged state at 0% and a fully charged state at 100%. The state of charge of the storage battery 12 may be displayed with an integrated current value (Ah), an integrated electric power value (Wh), or the like.

A current detector 22 and a voltage detector 24 are placed on the output line E2 of the power generator 16. When the power generator 16 is generating electric power, the current detector 22 measures a current value S3 flowing through the output line E2 and successively provides the measured value to the controller 14. Similarly, when the power generator 16 is generating electric power, the voltage detector 24 measures a voltage value S4 in the output line E2 and successively provides the measured value to the controller 14. The controller 14 acquires electric power (the actual electric power value) generated by the power generator 16 on the basis of the current value S3 provided by the current detector 22 and the voltage value S4 provided by the voltage detector 24.

Therefore, the controller 14 computes the actual electric power value of the power generator 16, which is based on the current value S3 and the voltage value S4, and computes the dischargeable electric power of the storage battery 12, which is based on the SOC information S2. Then, the controller 14 outputs a storage battery control signal S5 for controlling the charging and discharging state of the storage battery 12 and a power generation control signal S6 for controlling the power generation state of the power generator 16, in response to the charging and discharging command value S1 provided from the host system 18. Embodiments described below are different from each other in the configuration of the controller 14. The embodiments will be described in detail by using FIG. 2 to FIG. 5.

First Embodiment

Figure 2:
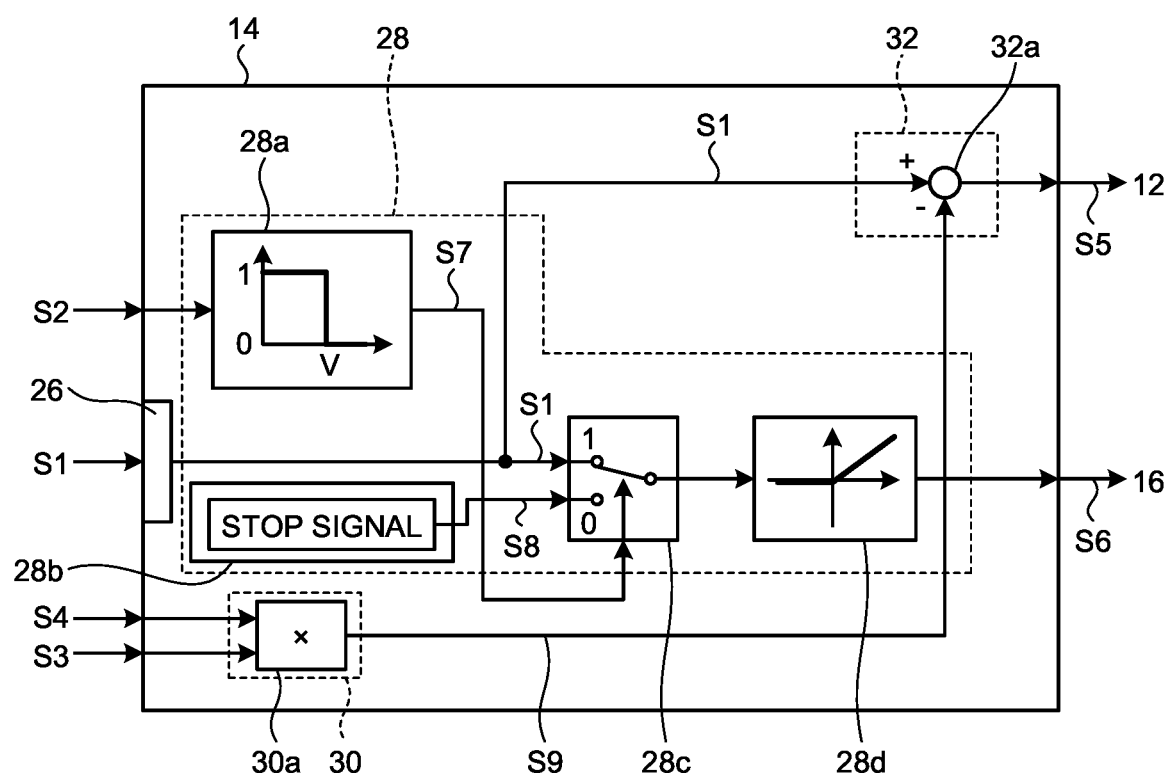
FIG. 2 is an exemplary and schematic block diagram illustrating a configuration of a controller of the power storage control system according to a first embodiment.

FIG. 2 is an exemplary and schematic block diagram illustrating a configuration of the controller 14 of the first embodiment in the power storage control system 10.

The controller 14 mainly includes a command acquisition unit 26 (an example of the command acquisition circuitry), a power generation controller 28 (an example of the power generation controller circuitry), an actual electric power acquisition unit 30 (an example of the actual electric power acquisition circuitry), and a power storage controller 32 (an example of the power storage controller circuitry).

The command acquisition unit 26 acquires the charging and discharging command value S1 input from the host system 18 and supplies it to the power generation controller 28 and the power storage controller 32.

The power generation controller 28 includes detailed circuits such as a determination circuit 28a, an operation signal generation circuit 28b, a state computing circuit 28c, and a limit circuit 28d.

Upon input of the SOC information S2 provided from the storage battery 12, if the charged state of the storage battery 12 is equal to or less than a preset SOC threshold V, the determination circuit 28a outputs a permission switching signal (a signal with a flag "1", for example) for permitting the start-up of the power generator 16. If the charged state of the storage battery 12 is larger than the SOC threshold V, the determination circuit 28a outputs a stop switching signal (a signal with a flag "0", for example) for stopping the power generator 16. The switching signal S7 (the permission switching signal or the stop switching signal) is provided to the state computing circuit 28c. Upon input of the permission switching signal, the state computing circuit 28c switches the switch to a "1" side and outputs the charging and discharging command value S1 input from the host system 18 as a command value to the power generator 16. On the other hand, upon input of the stop switching signal, the state computing circuit 28c switches the switch to a "0" side, receives a stop signal S8 generated by the operation signal generation circuit 28b, and outputs it as a command value to the power generator 16. Note that the power generator 16 is able to execute a power generation operation but unable to perform a charging operation. Therefore, a command regarding the charging side of the charging and discharging command value S1 output from the state computing circuit 28c is cut by the limit circuit 28d, and only a command value regarding power generation is output to the power generator 16 as the power generation control signal S6.

As described above, when the SOC (the state of charge) is larger than a given value (the SOC threshold V) (when the storage battery 12 is sufficiently charged) on the basis of the SOC information S2 of the storage battery 12, the power generation controller 28 outputs, to the power generator 16, a power generation stop signal causing the power generator 16 to stop power generation. On the other hand, when the SOC is equal to or less than the given value (when the storage battery 12 is not fully charged or when there is a margin for charging), the power generation controller 28 outputs, to the power generator 16, a power generation execution signal causing the power generator 16 to execute power generation.

By the way, in general, even if the power generation control signal S6 is provided to the power generator 16, output of power generation cannot instantly increase or decrease, but gradually increase or decrease. In other words, a response delay of output occurs in the power generator 16 in response to the power generation control signal S6. In addition, as described above, the power generator 16 cannot perform the charging operation in response to a charging command, so that there arises a difference between the charging and discharging command value S1 and the output of the power generator 16.

Considering the above, the power storage controller 32 of the power storage control system 10 outputs the storage battery control signal S5 causing the storage battery 12 to execute charging and discharging for satisfying the charging and discharging command value S1, on the basis of the difference between the charging and discharging command value S1 and an actual electric power value S9, which is actually generated by the power generator 16.

Specifically, the actual electric power acquisition unit 30 includes an electric power computing unit 30a. The electric power computing unit 30a calculates an electric power value being actually generated and output by the power generator 16 on the basis of a current value S3 provided by the current detector 22 and a voltage value S4 provided by the voltage detector 24. The actual electric power acquisition unit 30 outputs the calculated value to the power storage controller 32 as the actual electric power value S9.

The power storage controller 32 includes a subtraction circuit 32a. The subtraction circuit 32a subtracts the actual electric power value S9 provided by the actual electric power acquisition unit 30 from the charging and discharging command value S1 provided by the command acquisition unit 26. The power storage controller 32 outputs, to the storage battery 12, the storage battery control signal S5 indicating which of discharging control and charging control is to be performed by the storage battery 12, and indicating a discharging amount when discharging is performed, or indicating a charging amount when charging is performed.

The storage battery 12 can generally follow the charging and discharging command value S1 at a time order of $1/1,000$ second (ms). Therefore, the difference between the actual electric power value S9 of the power generator 16 and the charging and discharging command value S1 indicated by the host system 18 can be absorbed by the charging and discharging operation of the storage battery 12. Therefore, the power storage control system 10 as a whole can be operated as if it was performing the charging and discharging operation at high speed in accordance with the charging and discharging command value S1. In addition, when the SOC of the storage battery 12 increases, the power generation operation of the power generator 16 is stopped. Therefore, the effect of reducing an accumulated energy amount as the power storage control system 10 can be obtained. For example, when electric power supply based on the charging and discharging command value S1 is performed at the next control timing, a margin can be formed to allow the storage battery 12 to be charged so that the power generation amount of the power generator 16 can be made to follow the charging and discharging command value S1. In other words, smooth charging and discharging of the storage battery 12 can be achieved.

Figure 3:
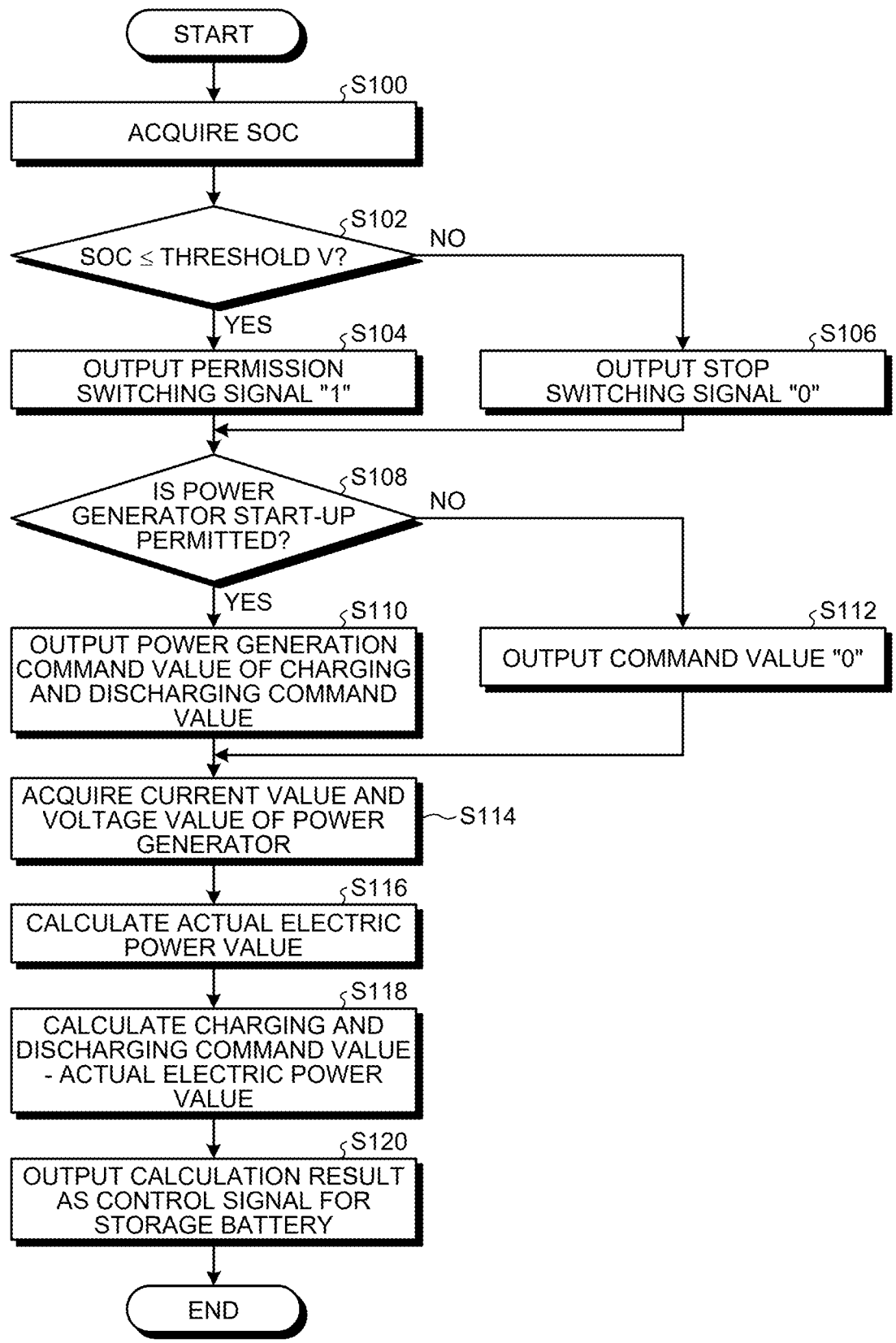
FIG. 3 is an exemplary flowchart of control of a power generator and a storage battery by the power storage control system according to the first embodiment.

FIG. 3 is an exemplary flowchart of control of the power generator 16 and the storage battery 12 by the power storage control system 10 of the first embodiment.

When the power storage control system 10 is in operation, the determination circuit 28a of the power generation controller 28 of the controller 14 successively acquires the SOC information S2 provided by the storage battery 12 (S100), compares the acquired SOC information S2 and a preset SOC threshold V with each other (S102), and constantly monitors the power storage state of the storage battery 12.

Then, when the result of the comparison between the acquired SOC information S2 and the preset SOC threshold V indicates that the current SOC is equal to or less than the SOC threshold V (SOC≤the threshold V) (Yes at S102), the determination circuit 28a outputs a permission switching signal "1" for permitting the start-up of the power generator 16 (S104). When the charged state of the storage battery 12 is larger than the SOC threshold V (No at S102), the determination circuit 28a outputs a stop switching signal "0" for stopping the power generator 16 (S106).

When the permission switching signal is acquired, that is, when the start-up of the power generator 16 is permitted (Yes at S108), the state computing circuit 28c outputs, to the limit circuit 28d, the charging and discharging command value S1 input via the command acquisition unit 26 and outputs only a power generation command value as the power generation control signal S6 to the power generator 16, which is obtained by cutting a command regarding a charging side of the charging and discharging command value S1 (S110). In other words, a control signal causing the power generator 16 to start power generation is output.

On the other hand, when the permission switching signal is not acquired at S108, that is, when the stop switching signal is acquired (No at S108), the state computing circuit 28c receives the stop signal S8 generated by the operation signal generation circuit 28b and outputs a command value "0" to the power generator 16 (S112). In other words, a control signal causing the power generator 16 to stop power generation is output.

Subsequently, the actual electric power acquisition unit 30 acquires the current value S3 provided by the current detector 22 and the voltage value S4 provided by the voltage detector 24 (S114). The actual electric power acquisition unit 30 calculates the actual electric power value S9 being currently generated and actually output by the power generator 16 (S116), and provides it to the power storage controller 32.

The power storage controller 32 calculates the difference between: the charging and discharging command value S1 input via the command acquisition unit 26, and the actual electric power value S9 input via the actual electric power acquisition unit 30 (S118). The power storage controller 32 outputs, to the storage battery 12, the calculation result as the storage battery control signal S5 for the storage battery 12 (S120), and ends control of the power generator 16 and the storage battery 12 by the power storage control system 10 based on this time input of the charging and discharging command value S1. The output of the storage battery 12 and the power generator 16 based on the charging and discharging command value S1 is provided to the commercial power supply 20, thus achieving accurate electric power supply following the charging and discharging command value S1.

As described above, according to the power storage control system 10 (the controller 14) of the first embodiment, the power generator 16 is provided along with the storage battery 12. During normal times, the storage battery 12 executes charging and discharging in accordance with the charging and discharging command value. But when the remaining energy amount as the state of charge (SOC) of the storage battery 12 decreases, the power generator 16 is started up to restore the remaining energy amount of the storage battery 12. As a result, electric power adjustment following the charging and discharging command value S1 can be performed while the capacity of the storage battery 12 remains decreasing. Even when, for example, a target output with a fast output change per time is required, a power storage control system capable of reducing the difference between the target output and the actual output can be provided.

Second Embodiment

Figure 4:
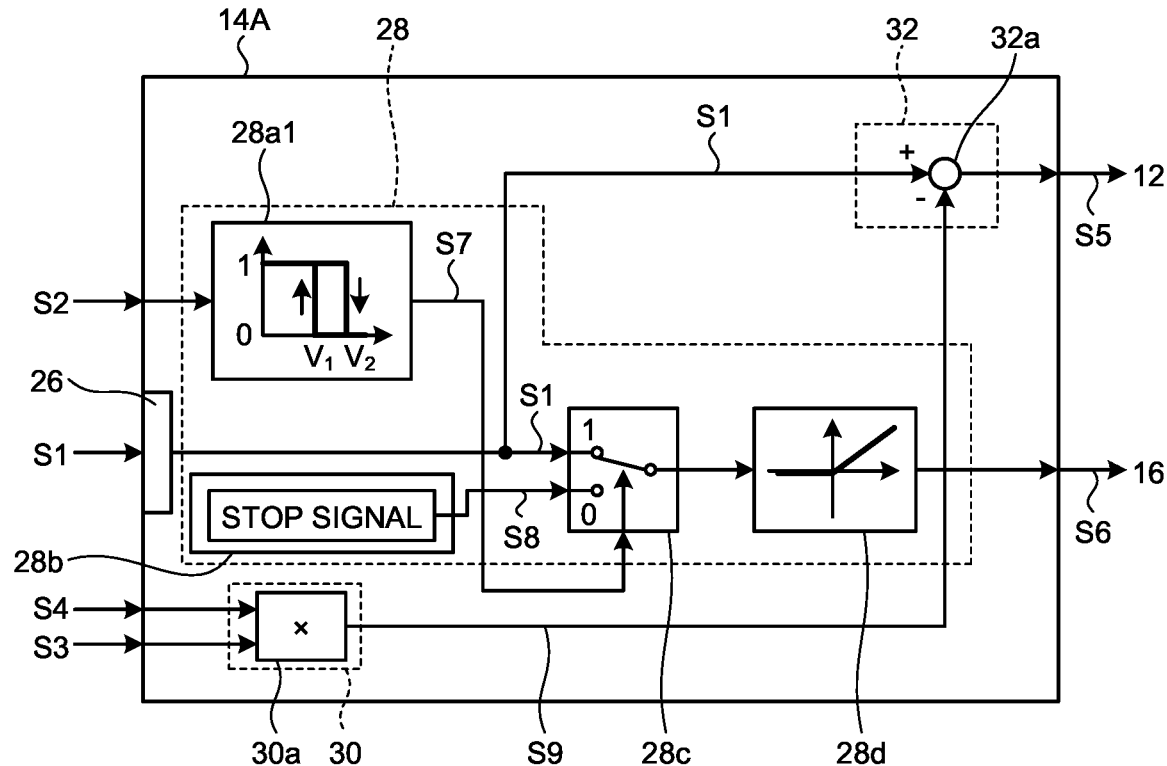
FIG. 4 is an exemplary and schematic block diagram illustrating a configuration of a controller of the power storage control system according to second and third embodiments.

The following describes a second embodiment in the power storage control system 10 with reference to FIG. 4. FIG. 4 is an exemplary and schematic block diagram illustrating a configuration of a controller 14A of the second embodiment. Note that the components of the controller 14 illustrated in FIG. 2 and the components of the controller 14A illustrated in FIG. 4 are different from each other only in a determination circuit 28al of the controller 14A against the determination circuit 28a of the controller 14, with the other components being substantially the same as each other. Therefore, the same components are denoted by the same symbols between FIG. 2 and FIG. 4, with their detailed description omitted.

The determination circuit 28al included in the controller 14A in FIG. 4 is a determination circuit with hysteresis properties. The determination circuit 28al of the power generation controller 28 sets a first threshold and a second threshold for the SOC threshold as the given value used when the start-up and stopping of the power generator 16 is determined on the basis of the SOC (the state of charge) of the storage battery 12. The first threshold is a threshold referred to when power generation by the power generator 16 is executed. The second threshold is a threshold higher than the first threshold referred to when power generation by the power generator 16 is stopped.

As the determination circuit 28a in FIG. 2, for example, in a case where the SOC thresholds V of start-up and stopping are the same SOC (a case of 20%, for example), when the power generator 16 executes the power generation operation and the SOC of the storage battery 12 reaches 20%, the stop switching signal (the flag "0") indicating the stopping of the power generator 16 is output from the determination circuit 28a, and power generation by the power generator 16 is stopped. In this case, if electric power output to the commercial power supply 20 is continued on the basis of the charging and discharging command value S1, the SOC of the storage battery 12 may immediately become 20% or less because the power generator 16 has stopped the power generation operation. As a result, the permission switching signal (the flag "1") indicating the start-up of the power generator 16 is immediately output by the determination circuit 28a, the power generator 16 again performs the power generation operation, and the SOC of the storage battery 12 reaches 20%. Therefore, the stop switching signal (the flag "0") indicating the stopping of the power generator 16 will be again output from the determination circuit 28a. In other words, what is called a "chattering phenomenon", in which the power generator 16 frequently repeats start-up and stopping, may occur.

Considering the above, an SOC threshold V1 (the first threshold) causing (permitting) the power generator 16 to execute power generation is set to, for example, 15%, and an SOC threshold V2 (the second threshold) stopping the power generation of the power generator 16 is set to 25%, for example. With these configurations, when the SOC of the storage battery 12 reaches 25% while the power generator 16 is in operation, the stop switching signal (the flag "0") is output from the determination circuit 28al, and the power generator 16 stops its operation. On the other hand, even when the SOC of the storage battery 12 decreases due to the stopping of operation of the power generator 16, the permission switching signal (the flag "1") indicating the start-up of the power generator 16 is not output from the determination circuit 28al until the SOC reaches 15%. In other words, compared to a case in which a single SOC threshold V is set, the interval between start-up and stopping is increased, and the switching operation can be inhibited from being frequently repeated.

As described above, according to the power storage control system 10 (the controller 14A) of the second embodiment, the power storage control system 10 as a whole can be operated as if it were performing the charging and discharging operation at high speed in accordance with the charging and discharging command value S1 and can also inhibit the occurrence of unnatural behavior in which the start-up and stopping of the power generator 16 are frequently repeated.

Third Embodiment

The following describes a third embodiment of the power storage control system 10 with reference to FIG. 4, which is also referred to in the description of the second embodiment. Therefore, also in the third embodiment, components having been already described are denoted by the same symbols, with their detailed description omitted.

When causing the power generator 16 to perform power generation, the power generation controller 28 outputs the power generation execution signal for executing power generation by the power generator 16 in a case where the SOC of the storage battery 12 is equal to or less than the given value (the SOC threshold V1) and the charging and discharging command value S1 is a value indicating discharging. The power generation execution signal causes the power generator 16 to execute power generation to follow the charging and discharging command value S1.

Specifically, consider a case where, in FIG. 4, the charging and discharging command value S1 is input to the state computing circuit 28c of the power generation controller 28 via the command acquisition unit 26, and the permission switching signal (the switching signal S7) for determining that the power generator 16 is permitted to start up is output by the determination circuit 28al on the basis of the SOC information S2 indicating the power storage state of the storage battery 12. In this case, when the SOC of the storage battery 12 is equal to or less than the given value (the SOC threshold V1), that is, when the power generator 16 is caused to perform power generation, the state computing circuit 28c outputs the charging and discharging command value S1 as a control signal so as to follow the charging and discharging command value S1. In this case, the command value on the charging side is cut by the limit circuit 28d. Then, the power generation control signal S6 following the discharge signal of the charging and discharging command value S1 is output to the power generator 16 to cause the power generator 16 to execute the power generation operation.

As described above, according to the power storage control system 10 (the controller 14A) of the third embodiment, when the remaining energy amount of the storage battery 12 decreases and the power generator 16 starts up, the storage battery 12 charges or discharges electric power that corresponds to the difference between the charging and discharging command value S1 and the actual electric power value S9 of the power generator 16. Therefore, excessive start-up and stopping of the power generator 16 can be avoided while the capacity of the storage battery 12 is the minimum, and electric power adjustment following the charging and discharging command value S1 can be performed. This configuration can also be applied to the controller 14 illustrated in FIG. 2, and the same effect can be obtained.

Fourth Embodiment

Figure 5:
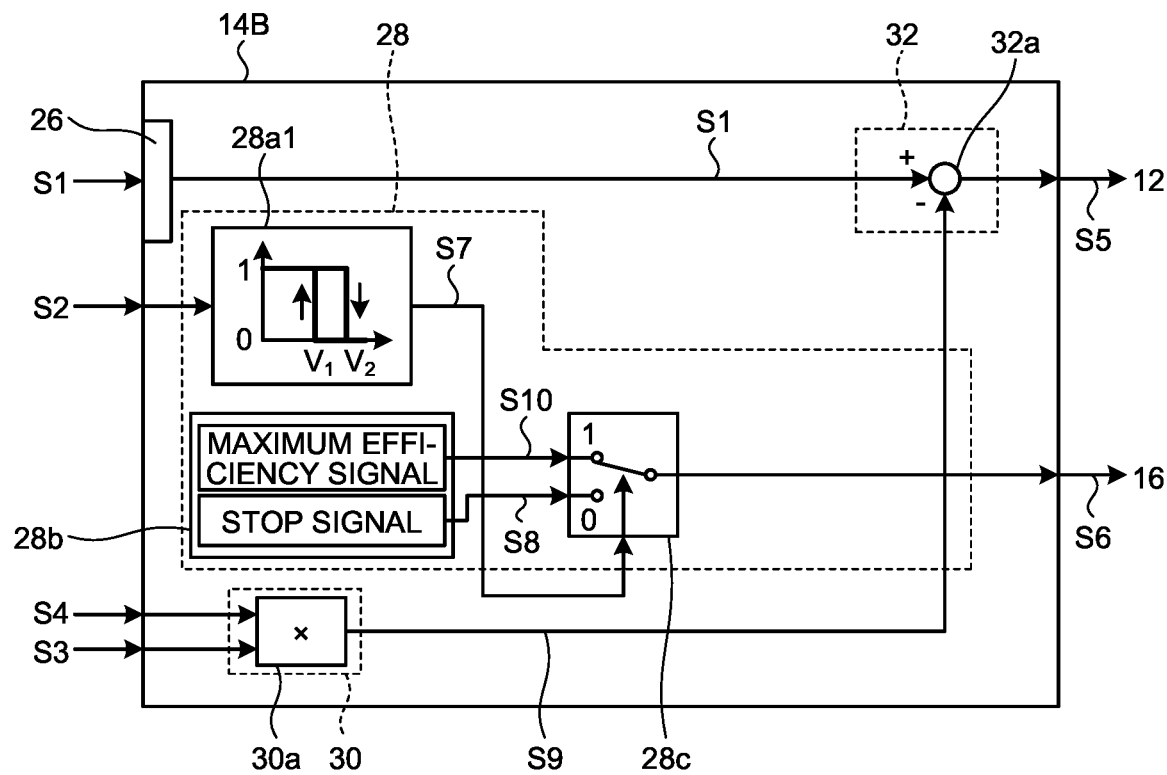
FIG. 5 is an exemplary and schematic block diagram illustrating a configuration of a controller of the power storage control system according to a fourth embodiment.

The following describes a fourth embodiment in the power storage control system 10 with reference to FIG. 5. FIG. 5 is an exemplary and schematic block diagram illustrating a configuration of a controller 14B of the fourth embodiment. The components of the controller 14A illustrated in FIG. 4 and the components of the controller 14B illustrated in FIG. 5 are different from each other in that, in the controller 14B, the charging and discharging command value S1 provided via the command acquisition unit 26 is input only to the power storage controller 32, the signal to be supplied to the state computing circuit 28c when causing the power generator 16 to execute power generation is different, and the limit circuit 28d is omitted. Therefore, the other components are substantially the same as those of the controller 14A and the controller 14B, and the same components are denoted by the same symbols, with their detailed descriptions omitted.

When causing the power generator 16 to perform power generation, the power generation controller 28 in the controller 14B of the fourth embodiment outputs a maximum efficiency signal S10 causing the power generator 16 to execute power generation with maximum efficiency operation when the SOC of the storage battery 12 is equal to or less than the given value (the SOC threshold V1).

The maximum efficiency signal S10 indicates output corresponding to an operation point at which efficiency of power generation executed by the power generator 16 becomes the highest. In general, as the generated electric power of the power generator 16 is closer to the rated output, the power generation efficiency becomes higher. In other words, when the power generator 16 starts up, the operation signal generation circuit 28b outputs the maximum efficiency signal S10 giving the maximum efficiency to operate the power generator 16. In other words, the operation of the power generator 16 is not performed on other than the maximum efficiency. Note that, in this case, the control signal output from the state computing circuit 28c does not include the command value on the charging side. Thus, the limit circuit 28d included in the controller 14A can be omitted, so that the system can be simplified. On the other hand, when the determination circuit 28a1 determines that the SOC of the storage battery 12 has exceeded a stopping threshold (the SOC threshold V2) and sufficient charging has been performed, and then outputs the stop switching signal (the switching signal S7), the operation signal generation circuit 28b outputs the stop signal.

As described above, according to the power storage control system 10 of the fourth embodiment, the power generator 16 can execute power generation only on the highest efficiency and can improve the power generation efficiency. Therefore, contribution to a reduction in power generation fuel can be made, and the loss of the entire power storage control system 10 can be reduced. This configuration can also be applied to the controller 14 illustrated in FIG. 2, and the same effect can be obtained.

The embodiments described above each present a power generation system such as a gas turbine, a steam turbine, or hydroelectric power generation as the power generator 16. In addition to this, a fuel cell or the like can also be used, and the effect can be obtained in the same way. The storage battery 12 generally includes a secondary battery in many cases, but it is not necessarily required to be the secondary battery so long as it is power storage means that can follow high-speed charging and discharging, such as electric double layer capacitors.

While some embodiments of the present invention have been described, the above embodiments and modifications are only by way of example and do not intend to limit the scope of the invention. The above embodiments can be performed in various modes, and various omissions, replacements, and modifications can be made without departing from the gist of the invention. The above embodiments and modifications thereof are included in the scope and the gist of the invention and are also included in the inventions described in the claims and equivalents thereof.

The invention claimed is:

1. A power storage control system comprising:
a storage battery capable of supplying electric power to an electric power system in collaboration with a power generator in response to a charging and discharging command value;
command acquisition circuitry configured to acquire the charging and discharging command value;
power generation controller circuitry configured to
output, to the power generator, a power generation stop signal causing the power generator to stop power generation, the power generation stop signal being output in a case where a state of charge of the storage battery is larger than a given value, and
output, to the power generator, a power generation execution signal causing the power generator to execute power generation, the power generation execution signal being output in a case where the state of charge is equal to or less than the given value;
actual electric power acquisition circuitry configured to acquire an actual electric power value generated by the power generator; and
power storage controller circuitry configured to output a storage battery control signal causing the storage battery to execute charging and discharging for satisfying the charging and discharging command value on the basis of a difference between the charging and discharging command value and the actual electric power value.

2. The power storage control system according to claim 1, wherein the power generation controller circuitry is configured to set a first threshold as the given value when causing the power generator to execute power generation, and
set a second threshold as the given value when causing the power generator to stop power generation, the second threshold being higher than the first threshold.

3. The power storage control system according to claim 1, wherein the power generation controller circuitry is configured to output the power generation execution signal in a case where the state of charge of the storage battery is equal to or less than the given value and the charging and discharging command value is a value indicating discharging, the power generation execution signal causing the power generator to execute power generation to follow the charging and discharging command value.

4. The power storage control system according to claim 1, wherein the power generation controller circuitry is configured to output the power generation execution signal in a case where the state of charge of the storage battery is equal to or less than the given value, the power generation execution signal causing the power generator to execute power generation with maximum efficiency operation.

5. The power storage control system according to claim 2, wherein the power generation controller circuitry is configured to output the power generation execution signal in a case where the state of charge of the storage battery is equal to or less than the given value and the charging and discharging command value is a value indicating discharging, the power generation execution signal causing the power generator to execute power generation to follow the charging and discharging command value.

6. The power storage control system according to claim 2, wherein the power generation controller circuitry is configured to output the power generation execution signal in a case where the state of charge of the storage battery is equal to or less than the given value, the power generation execution signal causing the power generator to execute power generation with maximum efficiency operation.

7. The power storage control system according to claim 3, wherein the power generation controller circuitry is configured to output the power generation execution signal in a case where the state of charge of the storage battery is equal to or less than the given value, the power generation execution signal causing the power generator to execute power generation with maximum efficiency operation.

* * * * *